US010790662B2

(12) United States Patent
Sharifipour et al.

(10) Patent No.: US 10,790,662 B2
(45) Date of Patent: Sep. 29, 2020

(54) DC BUS-BASED ELECTRICAL POWER ROUTER UTILIZING MULTIPLE CONFIGURABLE BIDIRECTIONAL AC/DC CONVERTERS

(71) Applicant: Katerra, Inc., Menlo Park, CA (US)

(72) Inventors: Bahman Sharifipour, Newington, NH (US); Mark Thomas, Cupertino, CA (US)

(73) Assignee: Katerra, Inc., Menlo Park, CA (US)

( * ) Notice: Subject to any disclaimer, the term of this patent is extended or adjusted under 35 U.S.C. 154(b) by 169 days.

(21) Appl. No.: 15/944,720

(22) Filed: Apr. 3, 2018

(65) Prior Publication Data

US 2019/0305554 A1    Oct. 3, 2019

(51) Int. Cl.
*H02J 3/14* (2006.01)
*G05F 1/577* (2006.01)
(Continued)

(52) U.S. Cl.
CPC .............. *H02J 3/14* (2013.01); *G05F 1/577* (2013.01); *H02J 1/102* (2013.01); *H02J 3/38* (2013.01); *H02M 5/458* (2013.01)

(58) Field of Classification Search
CPC .............. H02J 3/14; H02J 1/102; G05F 1/577
(Continued)

(56) References Cited

U.S. PATENT DOCUMENTS 6,134,124 A    10/2000  Jungreis et al.
6,369,461 B1   4/2002   Jungreis et al.
(Continued)

FOREIGN PATENT DOCUMENTS

WO    2010042118 A1    4/2010
WO    2018237089 A1    12/2018
WO    2019199875 A1    10/2019

OTHER PUBLICATIONS

International Search Report and Written Opinion for International Patent Application No. PCT/US2018/038624, dated Oct. 8, 2018, 11 pages.
(Continued)

*Primary Examiner* — Michael R. Fin
(74) *Attorney, Agent, or Firm* — Elliott, Ostrander & Preston, P.C.

(57) ABSTRACT

An electrical power distribution system includes a number of alternating current (AC) power output ports to transmit electrical power at a first fixed AC voltage level to a corresponding number of AC power loads. An AC bus coupled to the AC power output ports, and to couple to an AC power grid, transmits electrical power at a second fixed AC voltage level. A DC bus transmits electrical power at a first fixed DC voltage level. A number of AC power input/output (I/O) adapters are coupled to the AC bus and the DC bus, each including a bidirectional AC-to-DC (AC/DC) converter to receive and convert the electrical power transmitted on the AC bus at the second fixed AC voltage level to the electrical power at the first fixed DC voltage level for transmission to the DC bus, and to receive and convert the electrical power transmitted on the DC bus at the first fixed DC voltage level to the electrical power at the second fixed AC voltage level for transmission to the AC bus. The system further includes logic coupled to the AC power I/O adapters, the AC power output ports, and the AC bus, to control an amount of the electrical power transmitted from the AC power grid to the DC bus and from the DC bus to the AC bus for transmission to the AC power grid and/or one or more of the AC power output ports.

10 Claims, 3 Drawing Sheets

(51) Int. Cl.
*H02J 3/38* (2006.01)
*H02J 1/10* (2006.01)
*H02M 5/458* (2006.01)

(58) Field of Classification Search
USPC .............................................. 307/82, 26, 28
See application file for complete search history.

(56) References Cited

U.S. PATENT DOCUMENTS

| | | | |
|---|---|---|---|
| 6,512,966 | B2 | 1/2003 | Lof et al. |
| 7,162,878 | B2 | 1/2007 | Narayanamurthy et al. |
| 7,224,131 | B2 | 5/2007 | Wilhelm |
| 7,274,975 | B2 | 9/2007 | Miller |
| 7,466,042 | B2 | 12/2008 | Eldredge |
| 7,701,083 | B2 | 4/2010 | Savage |
| 8,008,808 | B2 | 8/2011 | Seeker et al. |
| 8,164,217 | B1 | 4/2012 | Miller |
| 8,370,650 | B2 | 2/2013 | Paniagua et al. |
| 8,401,709 | B2 | 3/2013 | Cherian et al. |
| 8,421,270 | B1 | 4/2013 | Miller et al. |
| 8,442,698 | B2 | 5/2013 | Fahimi et al. |
| 8,447,435 | B1 | 5/2013 | Miller et al. |
| 8,532,808 | B2 | 9/2013 | Drees et al. |
| 8,615,381 | B2 | 12/2013 | Brown |
| 8,649,914 | B2 | 2/2014 | Miller et al. |
| 8,781,640 | B1 | 7/2014 | Miller |
| 8,958,218 | B2 | 2/2015 | Reichard et al. |
| 9,024,594 | B2 | 5/2015 | Reichard et al. |
| 9,035,492 | B1 | 5/2015 | Miller |
| 9,093,862 | B2 | 7/2015 | Dennis et al. |
| 9,312,698 | B2 | 4/2016 | Subbotin et al. |
| 9,368,967 | B1 | 6/2016 | Vedder |
| 9,373,965 | B2 | 6/2016 | Liu et al. |
| 9,438,041 | B2 | 9/2016 | Roy et al. |
| 9,459,643 | B2 | 10/2016 | Miller et al. |
| 9,563,224 | B2 | 2/2017 | Saussele |
| 9,568,903 | B2 | 2/2017 | Miller |
| 9,570,753 | B2 | 2/2017 | Dennis et al. |
| 9,685,852 | B2 | 6/2017 | Somani et al. |
| 9,692,236 | B2 | 6/2017 | Wootton et al. |
| 9,937,810 | B2 | 4/2018 | Saussele et al. |
| 10,020,656 | B2* | 7/2018 | Saussele ............... H02J 1/00 |
| 10,389,134 | B2* | 8/2019 | Sharifipour ........... H02J 3/383 |
| 2008/0114870 | A1 | 5/2008 | Pu |
| 2011/0061057 | A1 | 3/2011 | Harris et al. |
| 2011/0095606 | A1 | 4/2011 | Ou |
| 2011/0140524 | A1 | 6/2011 | Realmuto et al. |
| 2011/0307897 | A1 | 12/2011 | Atterbury et al. |
| 2012/0319477 | A1 | 2/2012 | Brownlee |
| 2012/0083930 | A1 | 4/2012 | Ilic et al. |
| 2012/0267952 | A1 | 10/2012 | Ballatine et al. |
| 2013/0300196 | A1 | 11/2013 | Clark et al. |
| 2014/0049105 | A1 | 2/2014 | Ragavanis |
| 2014/0172182 | A1 | 6/2014 | Subbotin et al. |
| 2014/0183949 | A1 | 7/2014 | Murano |
| 2014/0200723 | A1 | 7/2014 | Roy et al. |
| 2015/0121113 | A1 | 4/2015 | Ramamurthy et al. |
| 2015/0207316 | A1 | 7/2015 | Saussele et al. |
| 2015/0253789 | A1 | 9/2015 | Saussele et al. |
| 2015/0318705 | A1 | 11/2015 | Lucas et al. |
| 2016/0042377 | A1 | 2/2016 | Ilic et al. |
| 2016/0111971 | A1 | 4/2016 | Rayner et al. |
| 2016/0334822 | A1 | 11/2016 | Kobayashi |
| 2017/0005473 | A1 | 1/2017 | Somani et al. |
| 2017/0006135 | A1 | 1/2017 | Siebel et al. |
| 2017/0093156 | A1 | 3/2017 | Ozbek et al. |
| 2017/0179723 | A1 | 6/2017 | Chen et al. |
| 2017/0194791 | A1 | 7/2017 | Budde |
| 2017/0358929 | A1* | 12/2017 | Koeppe ............... H02J 3/381 |
| 2019/0052094 | A1* | 2/2019 | Pmsvvsv ............... H02J 3/46 |

OTHER PUBLICATIONS

"Power Distribution Systems"; EATON, Apr. 2016; CA008104001E.
"Totally Integrated Power: Planning of Electrical Power Distribution, Technical Principles"; Siemans AG 2016; Article No. EMMS-T10007-00-7600; Germany.
Dinesh Kumar, Firuz Zare, Arindam Ghosh; "DC Microgrid Technology System Architectures, AC Grid Interfaces, Grounding Schemes, Power Quality, Communication Networks, Applications and Standardizations Aspects"; 2016; p. 1-3; figure 13; US.
Youngjin Kim, "Modeling and Analysis of a DC Electrical System and Controllers for Implementation of a Grid Interactive Building"; 2017; p. 1; p. 3-4; p. 8; p. 11; p. 12; p. 14; figure; US.
Final Office Action for U.S. Appl. No. 15/724,206, dated Nov. 16, 2018, 33 pages.
International Preliminary Report on Patentability for International Patent Application No. PCT/US2018/038624, dated Dec. 24, 2014, 9 pages.
International Search Report and Written Opinion for International Patent Application No. PCT/US2019/026647, dated Aug. 1, 2019, 8 pages.
Non-Final Office Action for U.S. Appl. No. 15/724,206, dated Jun. 28, 2018, 25 pages.
Non-Final Office Action for U.S. Appl. No. 15/952,172, dated Jan. 13, 2020, 8 pages.
Notice of Allowance for U.S. Appl. No. 15/724,2016, dated Apr. 10, 2019, 10 pages.
Restriction Requirement for U.S. Appl. No. 15/592,172, dated Nov. 21, 2019, 6 pages.
Final Office Action for U.S. Appl. No. 15/952,172, dated Apr. 22, 2020, 8 pages.

* cited by examiner

DC BUS-BASED ELECTRICAL POWER ROUTER UTILIZING MULTIPLE CONFIGURABLE BIDIRECTIONAL AC/DC CONVERTERS

TECHNICAL FIELD

Embodiments of the present invention relate to electrical power distribution systems and methods. In particular, embodiments of the invention route power between an AC power grid, a DC bus, and a plurality of AC electrical power loads.

BACKGROUND

Today, a building site does not need to obtain all electrical power from the public utility grid, or simply, "grid". There are alternative energy sources (AES) to the grid, for example photovoltaic (PV) solar, wind, geothermal, etc., that may be available. In most cases, an AES is in close proximity to the building site. For example, in the case of the PV solar, the solar panel may be located adjacent to or on the roof of a building. In addition, the building site may have access to locally stored power, e.g., in the form of lithium ion batteries or fuel cells.

Prior art equipment configurations used to produce, convert, distribute, and store power for or to a building site are complex and expensive, with many pieces of equipment and many interfaces. What is needed is a simple, relatively inexpensive system to produce, convert, distribute and store electrical power for a building site.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Embodiments of the invention contemplate an electrical power distribution system that includes a number of alternating current (AC) power output ports to transmit electrical power at a first fixed AC voltage level to a number of AC power loads. An AC bus is coupled to the AC power output ports, and to an AC power grid, and transmits electrical power at a second fixed AC voltage level. A DC bus transmits electrical power at a first fixed DC voltage level. A number of AC power input/output (I/O) adapters are coupled to and between the AC bus and the DC bus, each including a bidirectional AC-to-DC (AC/DC) converter to receive and convert the electrical power transmitted on the AC bus at the second fixed AC voltage level to the electrical power at the first fixed DC voltage level for transmission to the DC bus, and to receive and convert the electrical power transmitted on the DC bus at the first fixed DC voltage level to the electrical power at the second fixed AC voltage level for transmission to the AC bus. The system further includes logic coupled to the AC power I/O adapters, the AC power output ports, and the AC bus, to control an amount of the electrical power transmitted from the AC power grid to the DC bus and from the DC bus to the AC bus for transmission to the AC power grid and/or one or more of the AC power output ports.

Figure 1:
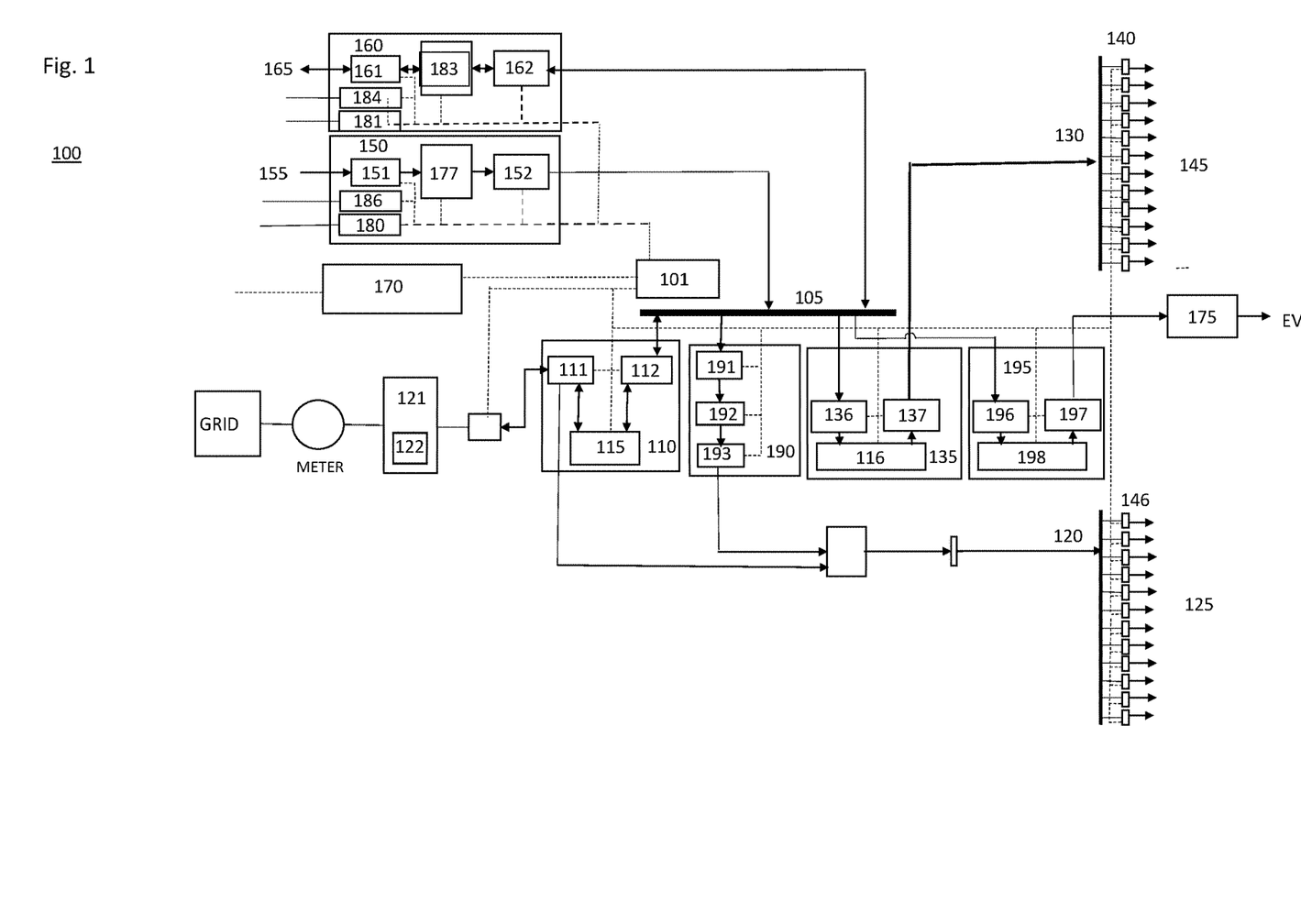
FIG. 1 illustrates an electrical power distribution system in which an embodiment of the invention may operate.

With reference to FIG. 1, an electrical power distribution system 100 comprises a central electrical power switch or router that receives DC electrical power from or to one or more electrical power sources and transmits the DC electrical power to one or more electrical power loads. In one embodiment, a DC bus 105 receives and transmits electrical power at a first fixed DC voltage level, for example, 800 volts, from one or more electrical power sources to one or more electrical power loads. The embodiment further includes a number of DC power output ports 130 to transmit electrical power at a second fixed DC voltage level to a corresponding number of DC power loads 145. For example, in one embodiment, the second fixed DC voltage level is 60 volts. In one embodiment, each output port 130 connects the electrical power distribution system to an individual unit in a building site, for example, a single family dwelling. There may also be other output ports connected to an electrical load in common or shared among the individual units, such as building site lighting or a control panel for a fire alarm system.

A like number of current and voltage sensors 140 respectively monitor the current and voltage usage for each of the DC power output ports 130. These sensors and associated circuitry, among other things, detect an amount of DC transmitted by the DC power output ports 130 to the DC power loads 145. It is contemplated that the sensors 140 may be hierarchically arranged, wherein one sensor 140 communicates with the other sensors 140 and aggregates information or data about the current and/or voltage usage of the DC power loads and communicates on behalf of all the sensors 140 with a controller such as controller 101 described herein below. Alternatively, each sensor 140 may communicate individually with controller 101.

In one embodiment, a DC power output adapter 135 couples the DC bus 105 to the DC power output ports 130 to provide DC power to the DC power loads 145. The DC power output adapter comprises an input bus interface 136 that couples the DC power output adapter 135 to the DC bus, and an output interface 137 that couples the DC power output adapter to the DC power output ports 130. A DC-to-DC (DC/DC) converter 116 is coupled to the input bus interface 136 and the output interface 137 to receive and convert the electrical power transmitted on the DC bus at the first fixed DC voltage level to electrical power at the second fixed DC voltage level for transmission to the DC power output ports 130. In one embodiment, the DC/DC converter is a 10 kW DC/DC converter.

The embodiment further includes a number of alternating current (AC) power output ports 120 to transmit electrical power at a first fixed AC voltage level to a corresponding number of AC power loads 125. For example, in one embpdiment, the first fixed AC voltage level is 240 volts AC (Vac). In one embodiment, each output port 120 connects the electrical power distribution system to an individual unit in the building site, for example, a single family dwelling. As in the case of output ports 130, there may be other output ports 120 connected to an electrical load in common or shared among the individual units.

A like number of current and voltage sensors 146 respectively monitor the current and voltage usage for each of the AC power output ports 120. These sensors and associated circuitry, similar to sensors 140, detect an amount of AC transmitted by the AC power output ports 120 to the AC power loads 125. It is contemplated that the sensors 146 may be hierarchically arranged, wherein one sensor 146 communicates with the other sensors 146 and aggregates information or data about the current and/or voltage usage of the AC power loads and communicates on behalf of all the sensors 146 with a controller such as controller 101. Alternatively, each sensor 146 may communicate individually with controller 101.

In one embodiment, an AC power input/output (I/O) adapter 110 couples the DC bus 105 to the AC power output ports 120 to provide AC power to the AC power loads 125. The AC power I/O adapter comprises an input/output bus interface 112 that couples the AC power I/O adapter 110 to the DC bus, and an input/output interface 111 that couples the AC power I/O adapter to the AC power output ports 120. A bidirectional AC-to-DC converter 115 is coupled to the input/output bus interface 112 and the input/output interface 111 to receive and convert the electrical power transmitted on the DC bus at the first fixed DC voltage level to electrical power at the first fixed AC voltage level for transmission to the AC power output ports 120. In one embodiment, the bidirectional AC/DC converter is a 50 kW bidirectional AC/DC converter.

The AC power I/O adapter 110 further is to couple to an AC power grid (e.g., a public utility grid) to receive and convert electrical power transmitted from the AC power grid at a second fixed AC voltage level to the electrical power at the first fixed AC voltage level for transmission to the AC power output ports 120. The AC power I/O adapter 110 comprises an input/output interface 111 that couples the AC power I/O adapter to the AC grid transformer module 121. In one embodiment, the bidirectional AC/DC converter 115 is coupled to the input/output interface 111 to receive and convert electrical power transmitted from the AC power grid at the second fixed AC voltage level to the electrical power at the first fixed DC voltage level for transmission to the DC bus via input/output interface 112, and to receive and convert the electrical power transmitted on the DC bus at the first fixed DC voltage level to the electrical power at the second fixed AC voltage level for transmission to the AC power grid. In other words, the electrical power distribution system 100 can feed back electrical power from the system to the grid, as conditions warrant.

In one embodiment, the bidirectional AC/DC converter 115 is coupled to the input/output interface 111 to receive and convert electrical power transmitted from the AC power grid at the second fixed AC voltage level to the electrical power at the first fixed AC voltage level for transmission to the AC power output ports 120 via input/output interface 111.

In one embodiment, an AC power output adapter 190 couples the DC bus 105 and to the plurality of AC power output ports 120 to provide AC power to the AC power loads 125. The AC power output adapter comprises an input bus interface 191 that couples the AC power output adapter to the DC bus, and an output interface 193 that couples the AC power output adapter to the AC power output ports 120. A DC-to-AC (DC/AC) converter 192 is coupled to the input bus interface 191 and the output interface 193 to receive and convert the electrical power transmitted on the DC bus at the first fixed DC voltage level to the electrical power at the first fixed AC voltage level for transmission to the AC power output ports. In an alternative embodiment, the bidirectional AC/DC converter 115 in the AC I/O power adapter 110 could provide the same functionality as DC/AC converter 192, but it would not provide the redundancy and failsafe functionality of having this functionality provided by DC/AC converter 192 located in the separate adapter 190.

Figure 2A:
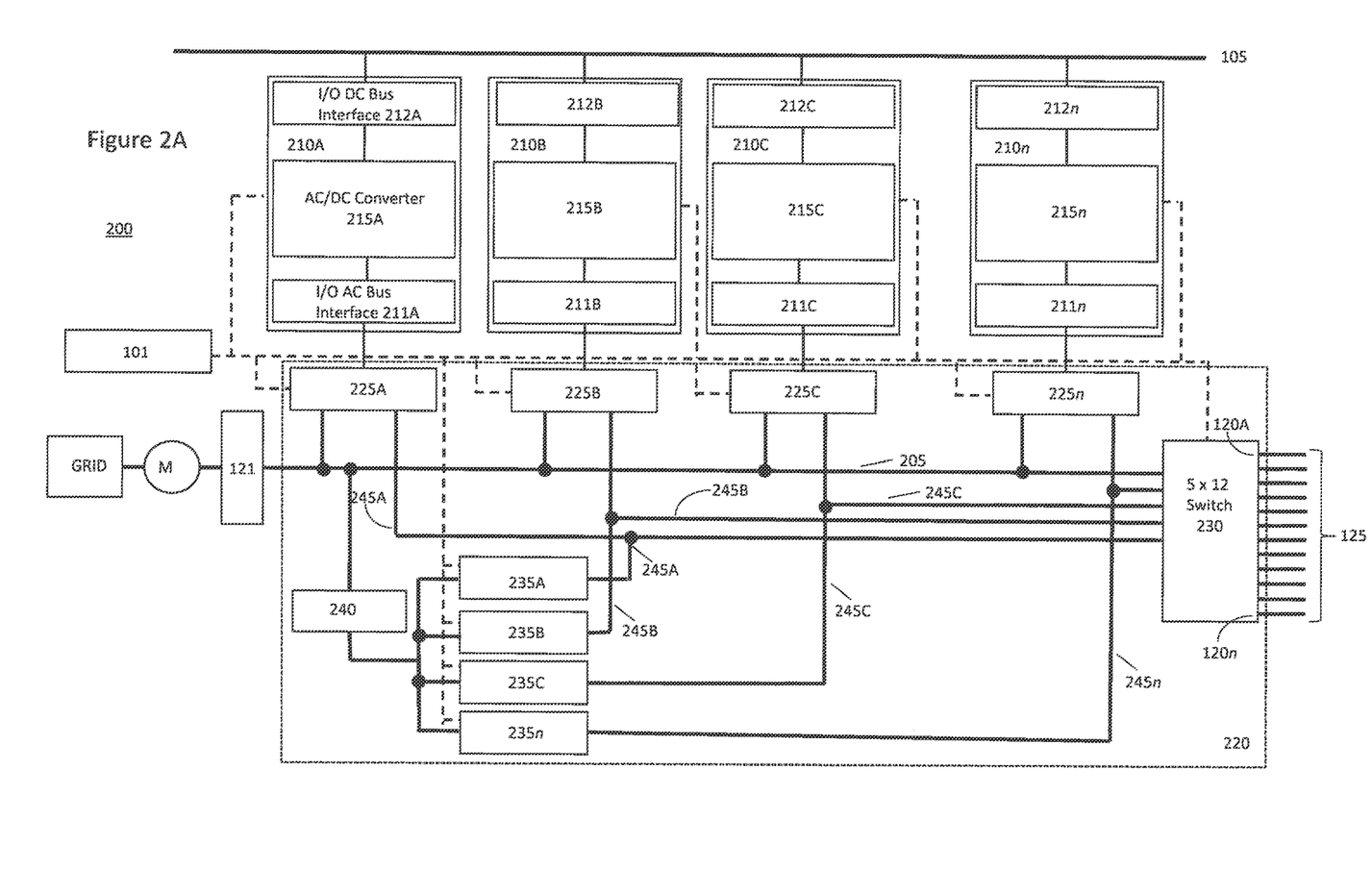
FIG. 2A illustrates an embodiment of the invention.

With reference to FIG. 2A, according to an embodiment 200, the electrical power distribution system includes a number of alternating current (AC) power output ports 120a-120n to transmit electrical power at a first fixed AC voltage level to a corresponding number of AC power loads 125. In one embodiment, the number of AC power output ports, 120n, is twelve (i.e., n=12), but it is appreciated that n can be more or less than 12. The AC power output ports are coupled via a switch module 230 to an AC bus 205 and a number of lines 245a-245n that each transmit electrical power at a second fixed AC voltage level. Depending on the value of the first fixed AC voltage level and the value of the second fixed AC voltage level, the second fixed AC voltage level may be greater than, the same as, or less than, the first fixed AC voltage level, as further described below. In one embodiment, the AC bus 205 is further to couple to the AC power grid, or AC transformer module 121 connected therewith. In one embodiment, the lines 245a-245n further couple via a number of AC power I/O adapters 210a-210n to DC bus 105. In the embodiment illustrated in FIG. 2A, the DC bus 105 likewise transmits electrical power at a first fixed DC voltage level.

In the illustrated embodiment, the number of AC power I/O adapters, n, is four, but it is appreciated that the number of AC power I/O adapters could be more or less than four. In one embodiment, the AC power I/O adapters 210a-210n each include a respective bidirectional AC-to-DC (AC/DC) converter 215a-215n to receive and convert the electrical power transmitted on the AC bus 205 at the second fixed AC voltage level to the electrical power at the first fixed DC voltage level for transmission to the DC bus 105, and, in the opposite direction, to receive and convert the electrical power transmitted on the DC bus 105 at the first fixed DC voltage level to the electrical power at the second fixed AC voltage level for transmission to the AC bus 205 or the lines 245a-245n. When the bidirectional AC/DC converter operates to receive and convert the electrical power transmitted on the DC bus 105 at the first fixed DC voltage level to the electrical power at the second fixed AC voltage level for transmission to the AC bus 205 or lines 245a-245n, it is essentially operating as a power inverter to change DC to AC. In order to tie to the AC power grid or to load share electrical power transmitted to the AC power output ports, the AC power I/O adapters synchronize their respective AC/DC converters with the AC power grid, essentially making them grid tied inverters.

The AC power I/O adapters also include a respective input/output DC bus interface 212a-212n that couples the AC power I/O adapter 210 to the DC bus 105, and a respective input/output AC bus interface 211a-211n that couples the AC power I/O adapter to the AC bus 205 or lines 245a-245n depending on the status of switches 225a-225n. Each bidirectional AC-to-DC converter 215 is coupled to the input/output DC bus interface 212 and the input/output AC bus interface 211 to receive and convert the electrical power transmitted on the AC bus 205 at the second fixed AC voltage level to the electrical power at the first fixed DC voltage level for transmission to the DC bus 105, and, in the opposite direction, to receive and convert the electrical power transmitted on the DC bus 105 at the first fixed DC voltage level to the electrical power at the second fixed AC voltage level for transmission to the AC bus 205 or lines 245a-245n. In one embodiment, each bidirectional AC/DC converter 215 is a 50 kW bidirectional AC/DC converter.

In one embodiment, logic 220 (e.g., a switch network) is coupled in communication with the AC power I/O adapters 210a-210n, the AC power output ports 120a-120n, and the AC bus 205, to control an amount of the electrical power transmitted from the AC power grid on the AC bus 205 at the second fixed AC voltage level to the DC bus 105 at the first fixed DC voltage level via one or more of the AC power I/O adapters 210a-210n. The logic 220 is further to control an amount of the electrical power transmitted from the DC bus 105 at the first fixed DC voltage level to the AC bus 205 at the second fixed AC voltage level via one or more of the AC power I/O adapters 210 for transmission to the AC power grid and/or for transmission to one or more of the AC power output ports 120a-120n via one or more of lines 245A-245n.

In one embodiment, logic 220 comprises a number of switches 225a-225n, 235a-235n, and 240, as well as switch module 230, each coupled in communication with controller 101 to receive instruction in the form of an electrical control signal to control the switches. In one embodiment, these switches are electromechanical switches. In another embodiment, the switches are solid state devices, for example, semiconductor-based switching devices. Switches 225a-225n are each coupled to a respective one of the AC power I/O adapters and the AC bus 205. Switches 235a-235n are each coupled to a respective one of switches 225a-225n and the AC bus 205. Switch module 230 is coupled to the AC bus, switches 225a-225n, and the AC power output ports 120a-120n.

In one embodiment, switches 225a-225n are single pole double throw (SPDT) switches, switches 235a-235n and 240 are single pole single throw (SPST) switches, and switch module 230 is a n by m switch, where n is a number of inputs and m is a number of outputs. In one embodiment, n=5 and m=12, so that switch module 230 is a 5×12 switch. In this embodiment, the switch module 230 can receive the second fixed AC voltage from the AC power grid via AC bus 205 which is tied to one input of the switch, or from the output of one or more of the AC power I/O adapters each tied via respective lines 245a, 245b, 245c, 245n to a respective one of the remaining four inputs of switch module 230. In one embodiment, the n inputs of the switch module 230 may be synchronized to allow for load sharing, that is, a given AC power load may be driven by more than one of the inputs of the switch module 230.

Controller 101 signals the switches in logic 220 to open or close, thereby disconnecting or connecting the individual paths between the AC bus and each of the AC power I/O adapters, AC power output ports, and the AC power grid. In so doing, depending on the configuration of the switches, the controller 101 controls the amount of the electrical power transmitted from the AC power grid on the AC bus 205 at the second fixed AC voltage level to the DC bus 105 at the first fixed DC voltage level via one or more of the AC power I/O adapters 210a-210n, and further controls the amount of the electrical power transmitted from the DC bus 105 at the first fixed DC voltage level to the AC bus 205 at the second fixed AC voltage level via one or more of the AC power I/O adapters 210a-210n for transmission to the AC power grid, and/or for transmission to one or more of the AC power output ports 120a-120n via lines 245a-245n.

AC Power Grid to DC Bus

As an example of operation of logic 220, the electrical power distribution system may transmit an amount of the electrical power from the AC power grid on the AC bus 205 at the second fixed AC voltage level to the DC bus 105 at the first fixed DC voltage level via one or more of the AC power I/O adapters 210a-210n, by controller 101 sending signals to close the switch on the input side (in the direction from the AC bus to the AC power I/O adapter) of one or more of switches 225a-225n, and to open the switch on the output side of all switches 225a-225n (in the direction from the AC power I/O adapter to the AC bus). In one embodiment, the controller further sends a signal to open switch module 230 and switches 235a-235n so that no electrical power is fed to the AC power output ports or back to the AC power grid.

DC Bus to AC Power Grid

As another example of the operation of logic 220, the electrical power distribution system may transmit an amount of electrical power from the DC bus 105 at the first fixed DC voltage level via one or more AC power I/O adapters 210a-210n to the AC bus at the second fixed AC voltage level for transmission to the AC power grid, by controller 101 sending signals to close the switch on the output side (from the AC power I/O adapter to the AC bus) of one or more of corresponding switches 225a-225n, and to open the switch on the input side of all switches 225a-225n (from the AC bus to the AC power I/O adapter). AC voltage at the second fixed AC voltage level flows thereby on one or more of lines 245a-245n. The controller further sends a signal to close corresponding ones of switches 235a-235n so that the AC voltage transmitted on the one or more lines 245a-245n at the second fixed AC voltage level is transmitted to the AC power grid via AC bus 205. In one embodiment, the controller further sends a signal to open switch module 230 so that no electrical power transmitted on AC bus 205 is fed to the AC power output ports 120a-120n.

In one embodiment, an additional switch 240, coupled in series between the switches 235a-235n and the AC bus 205, is also controlled by controller 101 and put in a closed position. Switch 240 is known as a "knife-switch", and is required according to UL1741 and UL1741 SA, in order to shut down access to the AC power grid via AC bus 205 when power from the AC power grid is lost, i.e., to separate the electrical power distribution system from the AC power grid.

DC Bus to AC Power Output Ports

In yet another example, the electrical power distribution system may transmit an amount of electrical power from the DC bus 105 at the first fixed DC voltage level via one or more AC power I/O adapters 210a-210n to a corresponding one or more of the lines 245a-245n at the second fixed AC voltage level for transmission to one or more of the AC power output ports 120a-120n, by controller 101 sending signals to close the switch on the output side (from the AC power I/O adapter to lines 245a-245n) of one or more of switches 225a-225n, and to open the switch on the input side of all switches 225a-225n. The controller further sends a signal to close one or more of the inputs of switch module 230 tied to each AC power I/O adapter output via a respective line 245a-245n so that AC voltage transmitted from each AC power I/O adapter is passed through switch module 230 to selected ones of the AC power output ports 120a-120n, and then on to the AC power loads 125. In one embodiment, the controller sends a signal to close one or more of the outputs of switch module 230 tied to each AC power load so that the AC voltage transmitted from each AC power I/O adapter passes through a selected one or more of the AC power output ports 120a-120n of switch module 230 to a corresponding selected number of AC power loads. The controller further sends a signal to open switches 235a-235n so that no electrical power is fed to the AC power grid, and to open the switch at the input of switch module 230 tied to the AC bus so that AC voltage transmitted on the AC bus at the second fixed AC voltage level is not transmitted to the AC power output ports.

As one possible scenario of operation, the system may have four AC power I/O adapters each with a capacity of 12.5 kW of power transmission for a total capacity of 50 kW of power transmission. Assuming an AC load requirement of 11 kW of power, one efficient method of operation is to shut down or maintain in a quiescent state 3 of the 4 AC power I/O adapters and transmit the 11 kW of power through just one of the AC power I/O adapters to the AC power output ports.

AC Power Grid to AC Power Output Ports

In another example of logic 220, the electrical power distribution system may transmit an amount of electrical power from the AC power grid on AC bus 205 at the second fixed AC voltage level to the AC power output ports, by controller 101 sending signals to open switches on both the input side and the output side of all of switches 225*a*-225*n*, and to close the switch for the one input of switch module 230 that is tied to AC bus 205. The controller further sends a signal to open the switch for all the other inputs of switch module 230 so that no electrical power is fed to the switch module from AC power I/O adapters 210*a*-210*n*, and to open switches 235*a*-235*n* and switch 240 so that no electrical power is fed back to the AC power grid. In one embodiment, the controller sends a signal to close one or more of the outputs of switch module 230 tied to each AC power load so that the AC voltage transmitted from the AC power grid over AC bus 205 passes through a selected one or more of the AC power output ports 120*a*-120*n* of switch module 230 to a corresponding selected number of AC power loads.

Figure 2B:
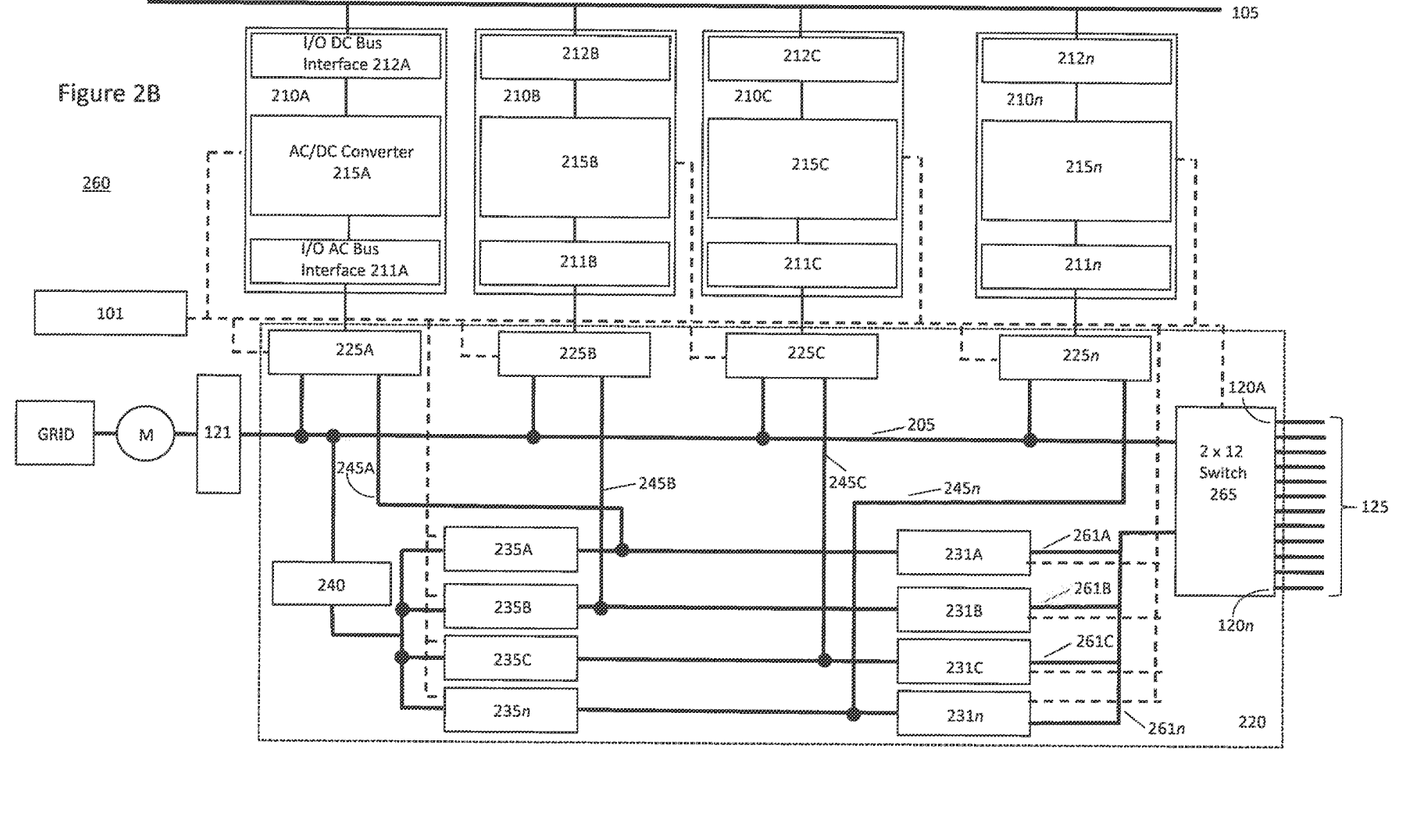
FIG. 2B illustrates another embodiment of the invention.

In one embodiment, if the first fixed AC voltage level is the same as the second fixed AC voltage level, AC to AC conversion need not happen. Alternatively, if the first and second fixed AC voltage levels differ, AC/AC conversion needs to occur. In one such embodiment, an AC/AC converter 122 may be situated at some point between the AC power grid and the electrical power distribution system, for example, at transformer module 121, or at the coupling between the AC bus 205 and the AC power output ports, for example, at or before where AC bus 205 connects to switch 230/265 or at or before where lines 245A-245*n*/261A-261*n* connect to switch 230/265, or at or after the coupling of the AC power output ports and the AC power loads, for example, in or after switch 230/264 where switch 230/264 couples to lines 120A-120*n*, to convert the electrical power transmitted at the second fixed AC voltage level to the electrical power to be transmitted at the first fixed AC voltage level.

One embodiment contemplates three different AC voltage levels: the first fixed AC voltage level at the AC loads, the second fixed AC voltage level on AC bus 205, and a third fixed AC voltage level received from the grid at grid transformer module 121. Under this embodiment, there are two AC/AC converters: one AC/AC converter located at the AC grid interface, e.g., before or within transformer module 121, for conversion from the third fixed AC voltage level to the second fixed AC voltage level, and a second AC/AC converter located on the input side of switch 230/265 for conversion of the second fixed AC voltage level to the first fixed AC voltage level. This provides for an electrical power distribution system whose internal AC voltage levels are independent on the type of grid voltage received at the system and the load voltages transmitted by the system. In such manner, the system's core circuitry that can be used by customers in various locations (e.g., countries or regions) where one or more of AC grid power and AC load power requirements may differ.

DC Bus to AC Power Grid and AC Power Output Ports

The above examples contemplate a single direction for electrical power passing through the electrical power distribution system and a given point in time, such as from the AC power grid to the DC bus, or from the DC bus to the AC power grid, or from the DC bus to the AC power output ports, or from the AC power grid to the AC power output ports. However, it is further contemplated that the electrical power may be sourced from more than one point, and/or delivered to one or more points, at the same time, by controller 101 manipulating logic 220 to control from where electrical power is received and to where electrical power is delivered.

For example, one embodiment contemplates electrical power transmitted from the DC bus to the AC power grid and to the AC power output ports, at the same time. In such an embodiment, the electrical power distribution system may transmit an amount of electrical power from the DC bus 105 at the first fixed DC voltage level via one or more of AC power I/O adapters 210*a*-210*n* to a corresponding one or more of the lines 245*a*-245*n* at the second fixed AC voltage level for transmission to one or more of the AC power output ports 120*a*-120*n* and for transmission to the AC power grid, by controller 101 sending signals to close the switch on the output side (from the AC power I/O adapter to lines 245*a*-245*n*) of one or more of switches 225*a*-225*n*, and to open the switch on the input side of all switches 225*a*-225*n*. The controller further sends a signal to close one or more of the inputs of switch module 230 tied to each AC power I/O adapter output via a respective line 245*a*-245*n* so that AC voltage transmitted from each AC power I/O adapter is passed through switch module 230 to the AC power output ports 120*a*-120*n*, and then on to the AC power loads 125. In one embodiment, the controller sends a signal to close one or more of the outputs of switch module 230 tied to each AC power load so that the AC voltage transmitted from each AC power I/O adapter passes through a selected one or more of the AC power output ports 120*a*-120*n* of switch module 230 to a corresponding selected number of AC power loads. The controller further sends a signal to close one or more of switches 235*a*-235*n* so that the AC voltage transmitted on the one or more lines 245*a*-245*n* at the second fixed AC voltage level is transmitted to the AC power grid via AC bus 205. The controller further sends a signal to open the switch at the input of switch module 230 tied to the AC bus so that AC voltage transmitted on to the AC bus at the second fixed AC voltage level is only transmitted to the AC grid, and not also transmitted to the AC power output ports.

In one embodiment, the additional switch 240, coupled in series between the switches 235*a*-235*n* and the AC bus 205, is also controlled by controller 101 and put in a closed position. Switch 240 is known as a "knife-switch", and is required according to UL1741 and UL1741 SA, in order to shut down access to the AC power grid via AC bus 205 when power from the AC power grid is lost, i.e., to separate the electrical power distribution system from the AC power grid. In one embodiment, sending power to one or more of the AC power output ports takes priority over sending power to the AC grid. Prioritization of such is under the direction of controller 101, and the signals it sends to one or more elements of logic 220.

AC Power Grid to DC bus and AC Power Output Ports

As an example of operation of logic 220, the electrical power distribution system may transmit an amount of the electrical power from the AC power grid on the AC bus 205 at the second fixed AC voltage level to the DC bus 105 at the first fixed DC voltage level via one or more of the AC power I/O adapters 210*a*-210*n*, by controller 101 sending signals to close the switch on the input side (in the direction from the AC bus to the AC power I/O adapter) of one or more of switches 225a-225n, and to open the switch on the output side of all switches 225a-225n (in the direction from the AC power I/O adapter to the AC bus). In one embodiment, the controller further sends a signal to close the switch on the one input of switch module 230 that is tied to AC bus 205, and open switches 235a-235n so that electrical power is also fed at the same time to the AC power output ports from the AC power grid but not fed back to the AC power grid.

AC Power Grid and DC bus to AC Power Output Ports

A further example of operation of logic 220 contemplates the AC power grid and the electrical power distribution system both transmitting at the same time a respective amount of the electrical power from the AC power grid on the AC bus 205 at the second fixed AC voltage level to AC power output adapters, and from the DC bus at the first fixed DC voltage level via one or more of the AC power I/O adapters 210a-210n to the AC power output adapters. In such an embodiment, controller 101 sends signals to open the switch on the input side (in the direction from the AC bus to the AC power I/O adapter) of all of switches 225A-225n, and to close the switch on the output side of one or more of switches 225A-225n (in the direction from the AC power I/O adapter to the AC bus) so that electrical power is able to be fed from the DC bus to the AC power output ports. In one embodiment, the controller further sends signals to close the switches at all inputs of switch module 230/265, and open switches 235a-235n so that electrical power is also fed at the same time to the AC power output ports from the AC power grid but not fed back to the AC power grid.

Alternate Embodiment of Switch Module 230

Another embodiment of the invention 260 is illustrated in FIG. 2B, wherein switch module 230 is replaced with switch module 265 and switches 231a-231n. In the embodiment illustrated in FIG. 2A, switch module 230 is a 5×12 switch, whereas the switch module 265 is a 2×12 switch module, having one input coupled to AC bus 205, and the only other input coupled to the output of switches 213a-231n. Essentially, the input switches that are included in switch 230 and connected to the output of each AC power I/O adapter are removed in switch module 265, and reside externally from switch module 265. The inputs to these switches still, however, connect to the outputs of the AC power I/O adapters and their outputs connect to the input of switch module 265, such that the combination of switch module 265 and switches 231a-231n perform the same functions in substantially the same manner as switch module 230. According to the embodiment 260 illustrated in FIG. 2B, load sharing is allowed for any combination of AC outputs from AC power I/O adapters 210a-210n as input to the 2×12 switch module 265. For a tenant metered situation it would therefore be possible to connect either AC grid power, or power from the DC bus, once inverted by one or more of the AC power I/O adapters. It is contemplated in such an embodiment that the outputs of the AC power I/O adapters are synchronized in phase and voltage to allow for load sharing.

With reference again to FIG. 1, in one embodiment, a DC power output adapter 195 couples the DC bus 105 and to DC power output port 175 to provide DC power to a DC power load 175, such an electric vehicle charging station. The DC power output adapter comprises an input bus interface 196 that couples the DC power output adapter to the DC bus, and an output interface 197 that couples the DC power output adapter to the DC power output port 175. A DC-to-DC (DC/DC) converter 198 is coupled to the input bus interface 196 and the output interface 197 to receive and convert the electrical power transmitted on the DC bus at the first fixed DC voltage level to electrical power a fixed DC voltage level for transmission to the DC power output port 175.

In one embodiment, with reference to FIG. 1, a controller 101 is coupled to the DC power output adapter 135, the current and voltage sensors 140 to control an amount of the electrical power transmitted on the DC bus 105 at the first fixed DC voltage level that the DC power output adapter 135 is to receive and convert to the electrical power at the second fixed DC voltage level for transmission to the DC power output ports 130, based on the amount of DC transmitted by the DC power output ports to the DC power loads as detected by the current and voltage sensors 140.

In one embodiment, controller 101 is coupled to the AC power I/O adapter 110, and the current and voltage sensors 146, to control an amount of the electrical power transmitted from the AC power grid at the second fixed AC voltage level that the AC power I/O adapter 110 is to receive and convert to the electrical power at the first fixed AC voltage level for transmission to the AC power output ports 120, based on the amount of AC transmitted by the AC power output ports 120 to the AC power loads 125 as detected by current and voltage sensors 146.

In one embodiment, controller 101 is coupled to the DC power output adapter 135, the current and voltage sensors 140, and the AC power I/O adapter 110, to control an amount of the electrical power transmitted from the AC power grid at the second fixed AC voltage that the AC power I/O adapter 110 is to receive and convert to the electrical power at the first fixed DC voltage level for transmission to the DC bus 105, based on the amount of DC transmitted by the DC power output ports 130 to the DC power loads 145 detected by current and voltage sensors 140.

In one embodiment, controller 101 is coupled to the AC power output adapter 190 and the current and sensors 146, to control an amount of the electrical power transmitted on the DC bus 105 at the first fixed DC voltage level that the AC power output adapter 190 is to receive and convert to the electrical power at the first fixed AC voltage level for transmission to the AC power output ports 120, based on the amount of AC transmitted by the AC power output ports to the AC power loads as detected by the current and sensors 146.

In one embodiment, controller 101 is to control the amount of the electrical power transmitted on the DC bus 105 at the first fixed DC voltage level that the AC power I/O adapter 110 is to receive and convert to the electrical power at the second fixed AC voltage level for transmission to the AC power grid, based on one or more of the amount of DC transmitted by the plurality of DC power output ports 130 to the plurality of DC power loads 145 as detected by the first circuitry, the amount of AC transmitted by the plurality of AC power output ports 120 to the plurality of AC power loads 125 as detected by the second circuitry, the state of the DC power source, and the state of the DC power storage device.

In one embodiment, the electrical power distribution system further comprises a DC power input adapter 150 coupled to the DC bus 105 and to couple to a DC power source 155 to provide DC power to the electrical power distribution system. In one embodiment, the DC power source is an alternative energy source, such as a PV solar power source. The DC power input adapter includes an input interface 151 that couples the DC power input adapter 150 to the DC power source 155, and an output bus interface 152 that couples the DC power input adapter to the DC bus 105.

A DC-to-DC (DC/DC) converter 177 is coupled to the input interface 151 and the output bus interface 152 to receive and convert electrical power transmitted by the DC power source at a third fixed DC voltage level to the electrical power transmitted on the DC bus at first fixed DC voltage level. In one embodiment, the third fixed DC voltage level is 1000 volts. In one embodiment, the DC/DC converter is a 1000 volt to 800 volt DC/DC converter.

Controller 101 further is coupled to the DC power input adapter 150 to control an amount of the electrical power at the third fixed DC voltage level that the DC power input adapter 150 is to receive and convert to electrical power at the first fixed DC voltage level for transmission on the DC bus 105.

The controller, in one embodiment, controls the amount of the electrical power at the third fixed DC voltage level that the DC power input adapter 150 is to receive and convert to electrical power at the first fixed DC voltage level for transmission on the DC bus 105, based on one or more of the amount of DC transmitted by the DC power output ports 130 to the DC power loads 145 as detected by the current and voltage sensors 140, the amount of AC transmitted by the AC power output ports 120 to the AC power loads 125 as detected by the current and voltage sensors 146, and the desirability of or the priority assigned to the electrical power transmitted from the AC power grid at the second fixed AC voltage level relative to the desirability of or priority assigned to the electrical power transmitted by the DC power source 155 at a third fixed DC voltage level. The desirability of or priority assigned to the electrical power transmitted from the AC power grid at the second fixed AC voltage level relative to the desirability of or priority assigned to the electrical power transmitted by the DC power source 155 at a third fixed DC voltage level may be based on, for example, one or more of unit price, environmental impact, availability, quality, stability, capacity, transmission or delivery efficiency, location or distance of a source, etc.

In one embodiment, DC power input adapter 150 includes parameter sensor 180 to detect a state of the DC power source 155. In such case, the controller 101 may control the amount of the electrical power at the third fixed DC voltage level that the DC power input adapter 155 is to receive and convert to electrical power at the first fixed DC voltage level for transmission on the DC bus 105 based on the state of the DC power source, or environmental factors that impact the state of the DC power source, such as, in the case where the DC power source is a PV solar power source, the temperature, wind, intensity and/or angle of incidence of sunlight to the DC power source, time of day, season, etc. In one embodiment, DC power input adapter 150 further includes a controller 186 in communication with DC power source 155 by which DC power input adapter 150 can control functionality of the DC power source 155.

The electrical power distribution system, in one embodiment, comprises a DC power input/output (I/O) adapter 160 coupled to the DC bus 105 and further to couple to a DC power storage device 165. The DC power I/O adapter includes an input/output interface 161 that couples the DC power I/O adapter to DC power storage device 165, and an input/output bus interface 162 that couples the DC power I/O adapter to the DC bus 105. A bi-directional DC/DC converter 183 is coupled to the input/output interface 161 and the input/output bus interface 162 to receive and convert the electrical power transmitted on the DC bus 105 at the first fixed DC voltage level to an electrical power transmitted to the DC power storage device 165 at a fourth fixed DC voltage level, and to receive and convert the electrical power transmitted from the DC power storage device 165 at the fourth fixed DC voltage level to the electrical power transmitted on the DC bus 105 at the first fixed DC voltage level. In one embodiment, the fourth fixed DC voltage level is 400 volts. In one embodiment, the DC/DC converter is a 400 volt to 800 volt DC/DC converter. In one embodiment, the DC power storage device is a Lithium-ion battery, and may include a battery management system.

In one embodiment, the controller 101 further is coupled to the DC power I/O adapter 160 to control an amount of the electrical power transmitted on the DC bus 105 at the first fixed DC voltage level that the DC power I/O adapter is to receive and convert to electrical power at the fourth fixed DC voltage level for transmission to the DC power storage device 165. In one embodiment, the amount of the electrical power transmitted on the DC bus 105 at the first fixed DC voltage level that the DC power I/O adapter 160 is to receive and convert to electrical power at the fourth fixed DC voltage level for transmission to the DC power storage device 165 is based on one or more of the amount of DC transmitted by the DC power output ports 130 to the DC loads 145 as detected by the current sensors 140, the amount of AC transmitted by the AC power output ports 120 to the AC loads 125 as detected by the current sensors 146, and the amount of the electrical power transmitted by the DC power source 160 at the third fixed DC voltage level.

In another embodiment, the controller further is to control an amount of the electrical power at the fourth fixed DC voltage level that the DC power I/O adapter 160 is to receive and convert for transmission on the DC bus 105 at the first fixed DC voltage level. The controller may do so based on one or more of the amount of DC transmitted by the DC power output ports 130 to the DC loads 145 as detected by the current sensors 140, the amount of AC transmitted by the AC power output ports 120 to the AC loads 125 as detected by the current sensors 146, the amount of the electrical power transmitted by the DC power source 155 at the third fixed DC voltage level, the desirability of or priority assigned to the electrical power transmitted from the AC power grid 120 at the second fixed AC voltage level relative to the desirability of or priority assigned to the electrical power transmitted by the DC power I/O adapter 165 at the fourth fixed DC voltage level, and the desirability of or priority assigned to the electrical power transmitted from the DC power source 155 at the third fixed DC voltage level relative to the desirability of or priority assigned to the electrical power transmitted by the DC power I/O adapter 165 at the fourth fixed DC voltage level. In these embodiments, desirability of or priority assigned to a particular electrical power source may be based on, for example, one or more of unit price, environmental impact, availability, quality, stability, capacity, transmission or delivery efficiency, location or distance of a source, etc.

In one embodiment, DC power I/O adapter 160 includes parameter sensor 181 to detect a state of the DC power storage device 165. In such case, the controller 101 may control the amount of the electrical power at the fourth fixed DC voltage level that the DC power I/O adapter 155 is to receive and convert to electrical power at the first fixed DC voltage level for transmission on the DC bus 105 based on the state of the DC power storage device, or factors that impact the state of the DC power storage device. In one embodiment, DC power I/O adapter 160 further includes a controller 184 in communication with DC power storage device 165 by which DC power I/O adapter 160 can control functionality of the DC power storage device 165.

In one embodiment, controller 101 is a central controller located within the electrical power distribution system and communicates with a microcontroller or the like located in each component it controls, for example, microcontrollers 180 and 181 respectively located in adapters 150 and 160. In another embodiment, the controller may be a distributed controller system, wherein each component described herein as being in communication with the controller may in fact incorporate or communicate with its own controller or a controller shared with a subset of the components in the electrical power distribution system. The controllers in such case communicate with each other as needed in order to perform the functions described herein. In all cases, the controller(s) may be hardwired in communication with the components and/or may be wirelessly in communication with the components. In another embodiment, an external controller 170 communicates with the controller(s). Controller 170 may be a part of a cloud-computing based energy management system and connect to controller 101 via the Internet, for example.

Embodiments of the invention can further be described as an electrical power distribution system 100 that includes an electrical power router. The power router has a number of input ports and a number of output ports, and distributes an electrical signal received on one or more of the input ports to one or more of the output ports. In one embodiment, the electrical power router is a common direct current (DC) bus with a number of bus interfaces. In such an embodiment, an electrical input adapter, e.g., DC power input adapter 150, is coupled to one of the electrical power router's input ports and further to couple to an electrical power source, e.g., PV solar power source 155. The electrical input adapter receives and converts an electrical signal input from the electrical power source to the electrical signal distributed by the power router. The electrical input adapter in such an embodiment includes an interface, e.g., interface 151, with the electrical power source that has electrical and mechanical characteristics that match those of the electrical power source, and an interface, e.g., interface 152, with the electrical power router that has electrical and mechanical characteristics that match those of the electrical power router.

Further in such an embodiment, an electrical output adapter, e.g., DC power output adapter 135, is coupled to one of the output ports and further to couple to an electrical power load, e.g., DC power loads 145. The electrical output adapter receives and converts the electrical signal distributed by the power router from the one of the output ports to an electrical signal output to the electrical power load. The electrical output adapter includes an interface, e.g., interface 137, with the electrical power load that has electrical and mechanical characteristics that match those of the electrical power load, and an interface, e.g., interface 136, with the electrical power router that has electrical and mechanical characteristics that match those of the electrical power router.

The embodiment further includes a controller 101 coupled to the electrical input adapter, the electrical output adapter, and the electrical power router, to control transmission of the electrical signal from the electrical input adapter to the electrical output adapter through the electrical power router. A subset of the bus interfaces have an electrical circuit coupled to the DC bus and to couple to a DC voltage output of an AC to DC converter or DC to DC converter of the electrical input adapter. The subset of the bus interfaces control an amount of current provided in the electrical signal to be distributed by the power router.

In one embodiment of the electrical distribution system, the subset of bus interfaces control the amount of current provided in the electrical signal to be distributed by the power router by performing one or more of the functions of: current direction control, current limit control, current magnitude control, current sensing, voltage sensing and voltage control on an input to the electrical circuit, voltage sensing and voltage control on an output of the electrical circuit.

In this embodiment, a second subset of the bus interfaces includes an electrical circuit coupled to the DC bus and to couple to a DC voltage input of a DC to DC converter or DC to AC converter of the electrical output adapter. The second subset of the bus interfaces control an amount of current received from the electrical signal distributed by the power router.

In one embodiment, the second subject of bus interfaces controls the amount of current received from the electrical signal distributed by the power router by performing one or more of the functions of: current direction control, current limit control, current magnitude control, current sensing, voltage sensing and voltage control on the input to the electrical circuit, voltage sensing and voltage control on the output of the electric circuit.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. An electrical power distribution system, comprising:
   a plurality of alternating current (AC) power output ports to transmit electrical power at a first fixed AC voltage level to a corresponding plurality of AC power loads;
   an AC bus, coupled to the plurality of AC power output ports, and to couple to an AC power grid, transmitting electrical power at a second fixed AC voltage level;
   a DC bus transmitting electrical power at a first fixed DC voltage level;
   a plurality of AC power input/output (I/O) adapters coupled in parallel to the AC bus and coupled in parallel to the DC bus, the plurality of AC power I/O adapters each comprising:
      a bidirectional AC-to-DC (AC/DC) converter to receive and convert the electrical power transmitted on the AC bus at the second fixed AC voltage level to the electrical power at the first fixed DC voltage level for transmission to the DC bus, and to receive and convert the electrical power transmitted on the DC bus at the first fixed DC voltage level to the electrical power at the second fixed AC voltage level for transmission to the AC bus; and
   logic coupled to the plurality of AC power I/O adapters, the plurality of AC power output ports, and the AC bus, to select and control an amount of the electrical power transmitted from the AC power grid via the AC bus at the second fixed AC voltage level to the DC bus at the first fixed DC voltage level via one or more of the plurality of AC power I/O adapters, wherein the logic comprises:
      a plurality of bidirectional switches that when closed each couple a respective one of the plurality of AC power input/output (I/O) adapters with the AC bus; and a controller coupled to each of the plurality of bidirectional switches to send an instruction to simultaneously:
close one or more of the plurality of switches in a direction from the AC bus to the AC power I/O adapters to select and control an amount of the electrical power transmitted from the AC power grid via the AC bus at the second fixed AC voltage level to the DC bus at the first fixed DC voltage level via one or more of the plurality of AC power I/O adapters, and
open all of the plurality of switches in a direction from the AC power I/O adapters to the AC bus to prevent the electrical power transmitted on the DC bus at the first fixed DC voltage level to the AC bus at the second fixed AC voltage level.

2. The electrical power distribution system of claim 1, wherein the logic is further to select and control an amount of the electrical power transmitted from the DC bus at the first fixed DC voltage level to the AC bus at the second fixed AC voltage level via one or more of the plurality of AC power I/O adapters for transmission to the AC power grid, wherein the controller coupled to each of the plurality of bidirectional switches to send an instruction to concurrently:
open all of the plurality of switches in a direction from the AC bus to the AC power I/O adapters to prevent the electrical power transmitted from the AC power grid via the AC bus at the second fixed AC voltage level to the DC bus at the first fixed DC voltage level via one or more of the plurality of AC power I/O adapters, and
close one or more of the plurality of switches in a direction from the AC power I/O adapters to the AC bus to select and control an amount of the electrical power transmitted on the DC bus at the first fixed DC voltage level to the AC bus at the second fixed AC voltage level.

3. The electrical power distribution system of claim 1, wherein the logic is further to select and control an amount of the electrical power transmitted from the DC bus at the first fixed DC voltage level via a selected one or more of the plurality of AC power I/O adapters for transmission to a selected one or more of the plurality of AC power output ports.

4. The electrical power distribution system of claim 1, wherein the logic is further to select and control an amount of the electrical power transmitted from the DC bus at the first fixed DC voltage level to the AC bus at the second fixed AC voltage level via one or more of the plurality of AC power I/O adapters for simultaneous transmission to the AC power grid and a selected one or more of the plurality of AC power output ports.

5. The electrical power distribution system of claim 1, wherein the logic is further to:
control an amount of the electrical power transmitted from the AC power grid via the AC bus at the second fixed AC voltage level to one or more of the plurality of AC power output ports; and
control an amount of the electrical power transmitted from the DC bus at the first fixed DC voltage level to the AC bus at the second fixed AC voltage level via one or more of the plurality of AC power I/O adapters for simultaneous transmission to the AC power grid and a selected one or more of the plurality of AC power output ports.

6. The electrical power distribution system of claim 1, wherein the logic is further to control an amount of the electrical power transmitted from the AC power grid via the AC bus at the second fixed AC voltage level to one or more of the plurality of AC power output ports.

7. The electrical power distribution system of claim 6, wherein the logic to control the amount of the electrical power transmitted from the AC power grid via the AC bus at the second fixed AC voltage level to one or more of the plurality of AC power output ports is further to control the amount of the electrical power transmitted from the AC power grid via the AC bus at the second fixed AC voltage level to one or more of the plurality of AC power output ports simultaneously with controlling the amount of the electrical power transmitted from the AC power grid via the AC bus at the second fixed AC voltage level to the DC bus at the first fixed DC voltage level via one or more of the plurality of AC power I/O adapters.

8. The electrical power distribution system of claim 6, wherein the first fixed AC voltage level is the same fixed AC voltage level as the second fixed AC voltage level.

9. The electrical power distribution system of claim 6, wherein the first fixed AC voltage level is a different fixed AC voltage level than the second fixed AC voltage level, the system further comprising:
an AC-to-AC (AC/AC) converter coupled to the AC power grid and to the plurality of AC power output ports to receive and convert the electrical power transmitted from the AC power grid via the AC bus at the second fixed AC voltage level to the electrical power at the first fixed AC voltage level for transmission to one or more of the plurality of AC power output ports.

10. The electrical power distribution system of claim 6, wherein the first fixed AC voltage level is a different fixed AC voltage level than the second fixed AC voltage level, the system further comprising:
an AC-to-AC (AC/AC) converter coupled to an input to the plurality of AC power output ports, the converter to receive and convert the electrical power transmitted at the second fixed AC voltage level to the electrical power at the first fixed AC voltage level for transmission to one or more of the plurality of AC power output ports.

* * * * *